United States Patent
Zhang

Patent Number: 6,065,030
Date of Patent: May 16, 2000

[54] METHOD AND APPARATUS FOR IMPLEMENTING SHORT-WORD DIVISION TECHNIQUES IN A MULTIPLE MODULUS CONVERSION CONTEXT

[75] Inventor: Xuming Zhang, Mission Viejo, Calif.

[73] Assignee: Conexant Systems, Inc., Newport Beach, Calif.

[21] Appl. No.: 09/050,263

[22] Filed: Mar. 30, 1998

[51] Int. Cl.[7] .............................. G06F 7/38; H04L 27/04
[52] U.S. Cl. ............................................ 708/491; 375/295
[58] Field of Search ................................ 708/491–492, 708/650; 375/295

[56] References Cited

U.S. PATENT DOCUMENTS

| | | |
|---|---|---|
| 5,103,227 | 4/1992 | Betts . |
| 5,230,010 | 7/1993 | Betts et al. . |
| 5,280,503 | 1/1994 | Betts et al. . |
| 5,475,711 | 12/1995 | Betts et al. . |
| 5,598,435 | 1/1997 | Williams . |
| 5,684,834 | 11/1997 | Betts et al. . |
| 5,825,816 | 10/1998 | Cole et al. . |
| 5,838,724 | 11/1998 | Cole et al. . |
| 5,844,944 | 12/1998 | Betts et al. . |
| 5,859,877 | 1/1999 | Betts et al. . |
| 5,995,548 | 11/1999 | Williams et al. ............... 375/242 |

FOREIGN PATENT DOCUMENTS

WO 98/39883  9/1998  WIPO .

OTHER PUBLICATIONS

Hwang, Kai "Computer Arithmetic". John Wiley & Sons, N.Y., see paragraphs 7.2 and 7.6. XP002102697.

Shatalov, A A "Discrete Convolution Calculation Algorithms Employing Number–Theoretic Transformations in Single–Modulus and Multimodulus Residue Arithmetic". Telecommunications and Radio Engineering, vol. 48, No. 1, Jan. 1, 1993, pp. 28–33. XP000447129.

Szabo, et al. "Residue Arithmetic and Its Applications to Computer Technology". McGraw–Hill, N.Y., 1967, pp. 185–188. XP002102698.

A Mapping Scheme Based on the CRT and the UFT, Telecommunications Standarization Sector, Digicom Systems, Sep. 4–5, 1997.

*Primary Examiner*—Tan V. Mai
*Attorney, Agent, or Firm*—Snell & Wilmer L.L.P.

[57] ABSTRACT

An improved multiple modulus conversion (MMC) procedure is provided that employs an alternate scheme for obtaining the MMC outputs in response to a binary input of a number of bits. The alternate MMC procedure utilizes short-word division operations such that a practical digital processor may efficiently perform the required binary divisions. An exemplary short-word division process partitions the original long-word binary input into a plurality of short binary words, each having an equal number of bits. Individual short words or a combination of two short words are then divided by the appropriate modulus in a systematic manner to obtain the quotient and remainder associated with the particular division operation. The short-word divisions technique may be employed throughout the entire MMC procedure to suitably obtain the output values associated with each modulus.

19 Claims, 4 Drawing Sheets

METHOD AND APPARATUS FOR IMPLEMENTING SHORT-WORD DIVISION TECHNIQUES IN A MULTIPLE MODULUS CONVERSION CONTEXT

FIELD OF THE INVENTION

The present invention relates generally to the use of multiple modulus conversion (MMC) techniques for use with binary input data. In particular, the present invention relates to the use of short-word division methodologies during an MMC procedure.

BACKGROUND OF THE INVENTION

The new generation of 56 kbps modem systems utilize a number of techniques that differ from conventional analog voice band modems (e.g., modems compatible with the V.34 standard). 56 kbps modem systems employ pulse code modulation (PCM) technology to facilitate higher downstream transmission data rates to an end user. For example, FIG. 1 depicts a conceptual diagram of a typical 56 kbps communication path using current PCM modem technology. A central site, such as an internet service provider (ISP) 100, is digitally connected to a telephone network 130 through a transmitter 110 and a receiver 120 of an ISP modem 105. The network 130 is connected to a local loop 150 through a central office line card 140. The line card typically has a PCM codec implemented therein. The local loop 150 is connected to the user's personal computer (PC) 170 at the user's site through the user's modem 160. As can be appreciated by those skilled in the art, the connection between the ISP modem transmitter 110 to the telephone network 130 is a digital connection with a typical data rate of 64 kbps. Since the parameters of the telephone network 130 and line card 140 are dictated and set by the operating specifications of the network (and particularly the use of the $\mu$-law or A-law signal point constellations), the central site transmitter 110 is configured to transmit the digital data in a particular way to fully exploit its digital connection to the network.

A proposed operating protocol for 56 kbps PCM modem systems calls for the use of a data transmission scheme that performs multiple modulus conversion (MMC) on a number of bits that may be provided by a suitable scrambler or other processing element. Betts et al., U.S. Pat. No. 5,475,711, issued Dec. 12, 1994 and Betts et al., U.S. Pat. No. 5,684,834, issued Nov. 4, 1997, disclose data transmission systems that utilize single modulus converters in different contexts. MMC, on the other hand, is a known technique for expressing an integer number as a sum of quotients containing multiple moduli (or bases). A technical contribution by Dale Walsh entitled *Multiple Modulus Conversion for Robbed Bit Signaling Channels* (TIA TR30 Meetings, Mar. 4, 1997) sets forth one manner in which MMC may be used in the context of 56 kbps modem systems. The entire content of these publications is incorporated herein by reference.

In accordance with the MMC process, an integer (R) may be expressed as:

$$R=K_0+K_1M_0+K_2M_0M_1+\ldots+K_{L-1}M_0M_1\ldots M_{L-2},$$

where $M_i$ are the moduli, L is the number of moduli used to express R, and $0 \leq K_i < M_i$. In the context of a 56 kbps modem system, L also represents the number of symbols transmitted per data frame and the values of $M_i$ also represent the number of signal point magnitudes contained in the signal point constellation associated with the i-th data frame phase.

In such a context, the multiple moduli $M_i$ (which are determined prior to the MMC mapping such that $2^B \leq M_0 M_1 \ldots M_{L-1}$ is satisfied where B is the number of input bits associated with the MMC process) are used to map a number of bits expressed as the integer R. In the 56 kbps modem context, MMC operates in the absence of sign bits; sign bits are removed prior to the MMC process and replaced afterward. The MMC process generates the values of $K_i$, which represent mapping indices associated with the respective signal point constellations. Thus, each $K_i$ value is used to select a particular PCM codeword for transmission over the telephone network. Upon decoding at the receiving modem, the original digital data is recovered (assuming no transmission errors).

Current MMC techniques for use with 56 kbps modem systems may not be implemented in an efficient manner. The MMC process necessarily requires a large number of computations, such as long word division, which may require an undesirably large amount of calculations and program code development time. Accordingly, such known MMC processes may be difficult to implement in a modem context where high data transmission rates are required. For example, some MMC procedures may not be capable of easily mapping very long digital sequences, e.g., integer numbers represented by 35 or more bits. Furthermore, such known MMC techniques may not lend themselves to systematic derivations of the $K_i$ index values; this limitation may increase the complexity of the MMC process.

In a practical system, the efficiency of the MMC procedure may depend upon the bit capacity of the digital signal processors employed by the system. It is well known that division routines in fixed point digital signal processors are notoriously inefficient. For example, many data communications systems employ a 16 bit signal processor. As such, binary operations may not be conveniently performed on digital inputs exceeding 16 bits. Indeed, when a large number of bits are input to the MMC process, an undesirably large number of operations may be required to adequately produce the appropriate output.

Accordingly, an improved MMC technique is needed to address the above shortcomings of the prior art.

SUMMARY OF THE INVENTION

An advantage of the present invention is that it provides improved techniques for use in a modem system that employs a multiple modulus conversion (MMC) procedure.

Another advantage of the present invention is that an efficient MMC procedure is provided that is suitable for inputs represented by a relatively high number of bits.

A further advantage of the present invention is that it provides a systematic technique for performing an MMC procedure.

Another advantage is that the present invention enables MMC processing of a large number of input bits by practical digital processors that have a limited bit processing capacity.

The above and other advantages of the present invention may be carried out in one form by a modulus encoder having first means for obtaining a number of moduli, second means for obtaining a binary input having a plurality of bits, and a processor suitably configured to represent the binary input as a plurality of short words and perform a short-word division procedure in connection with the short words to thereby determine a plurality of index values associated with the moduli.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION OF PREFERRED EMBODIMENTS

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, digital signal processing elements, look-up tables, and the like, which may carry out a variety of functions under the control of one or more microprocessors or other control devices. In addition, those skilled in the art will appreciate that the present invention may be practiced in any number of signal processing and data communication contexts and that the modem system described herein is merely one exemplary application for the invention.

Figure 1:
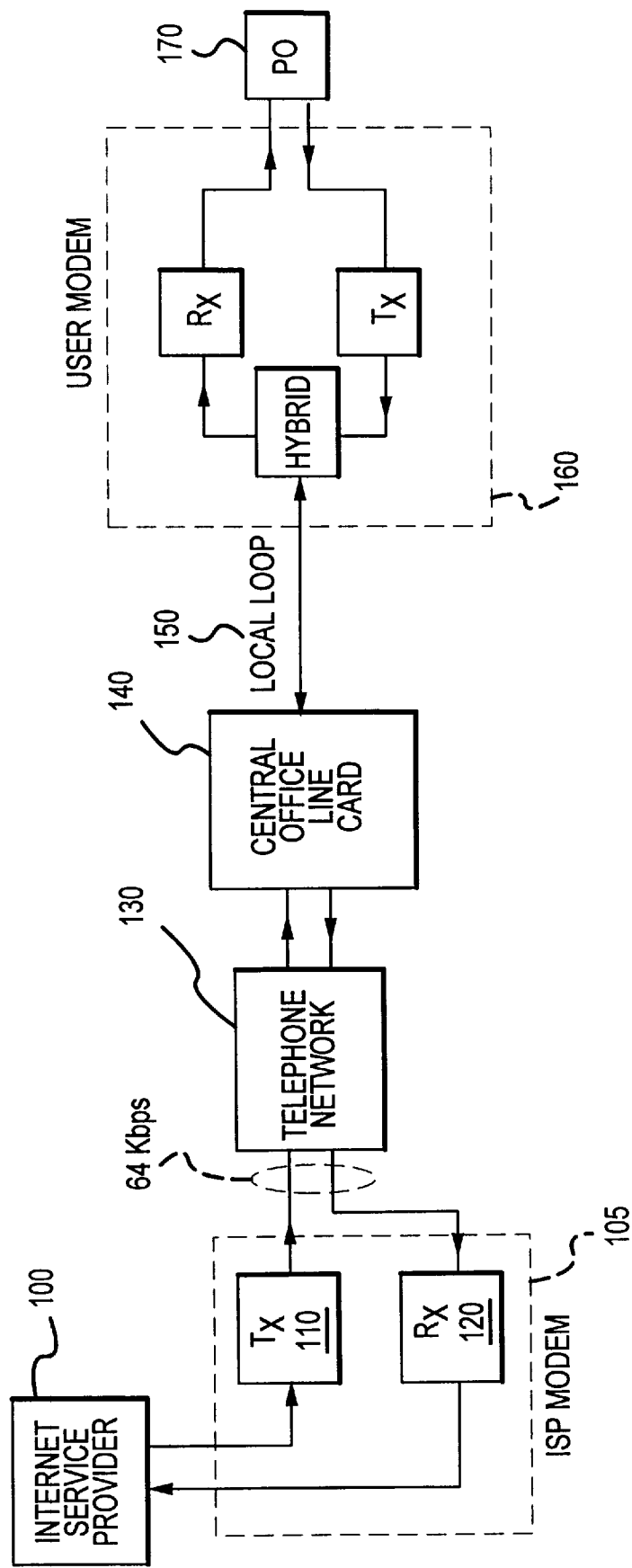
FIG. 1 is a conceptual block diagram of an exemplary data communication system using PCM techniques.
Figure 2:
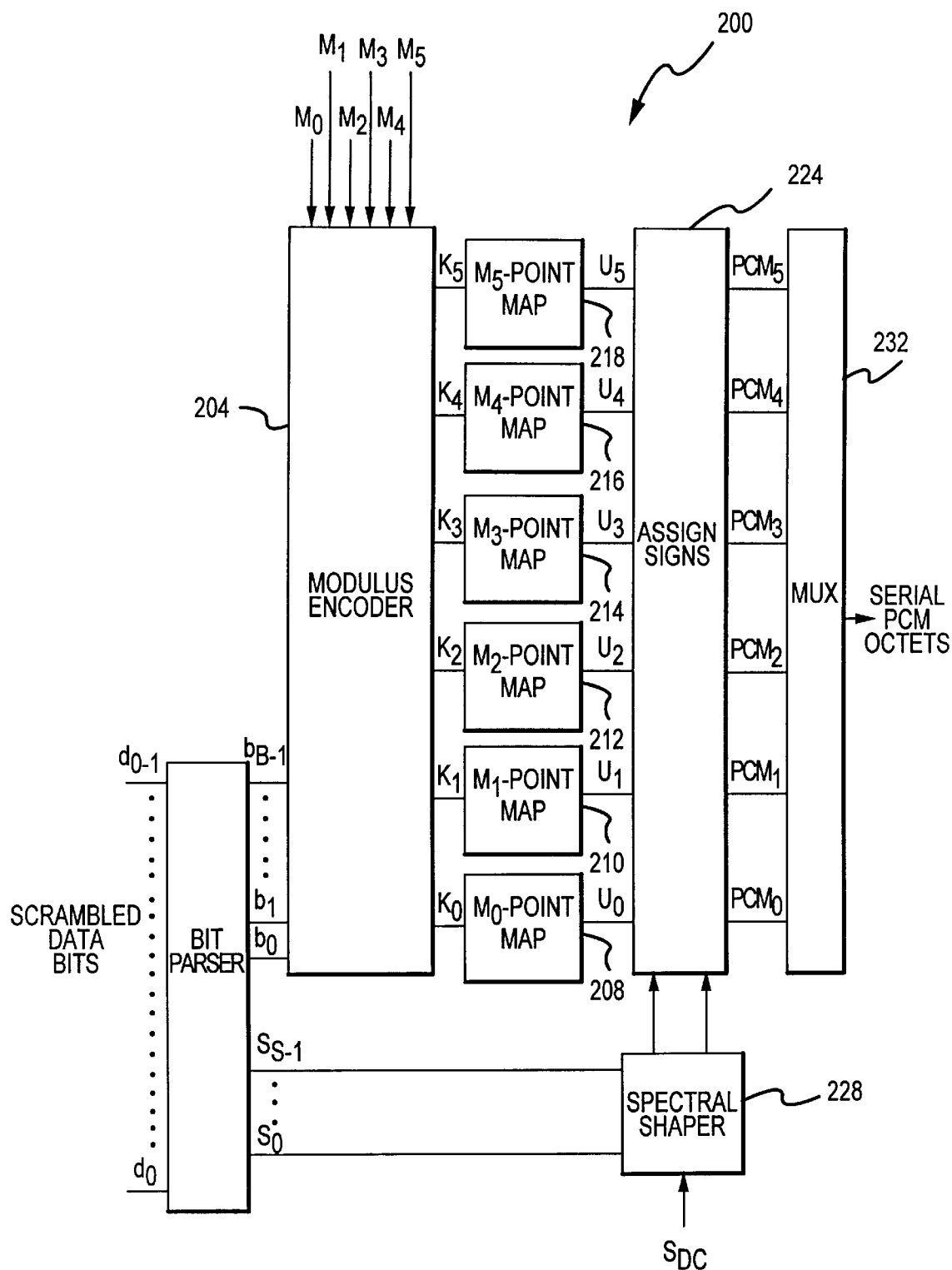
FIG. 2 is a conceptual block diagram of an exemplary encoder that may be used in the ISP modem shown in FIG. 1.

With reference to FIGS. 1–2, an exemplary 56 kbps PCM-based modem transmitter includes an encoder 200, which is generally configured to convert a number of input bits (identified as bits $b_0$–$b_{B-1}$) into unsigned PCM codewords. The PCM codewords (identified as $PCM_0$–$PCM_5$) are transmitted in a serial manner through telephone network 130 as 8-bit octets or symbols. In accordance with currently proposed operating protocols, each data frame is represented by six symbols, however, the present invention may be employed in connection with any frame length, symbol size, or number of bits processed by encoder 200.

Encoder 200 preferably includes a modulus encoder 204 configured to perform an MMC procedure on the digital data input thereto. For purposes of this description, B is the number of bits that are input into modulus encoder 204 for a given data frame. As shown in FIG. 2, a number of bits ($S_0$–$S_{s-1}$) are removed from the input of scrambled data bits such that the MMC procedure is only performed on information bits used to map the signal point magnitudes. Following the MMC procedure, sign bits may be assigned to each symbol in a suitable manner. In accordance with the preferred embodiment of the present invention, several operating parameters may be predetermined by the modem system prior to operation in a normal data mode. For example, the number of bits input into modulus encoder 204 may depend upon a current data rate and the number of redundant sign bits used during data transmission. Both of these parameters may be adaptively established between ISP modem 105 and user modem 160 during an initialization period. In one proposed 56 kbps operating scheme, B (the number of incoming MMC bits) may range between 15 and 39 bits; lower values of B correspond to lower data rates. Of course, the range of B may vary depending on the specific application and the present invention is not limited to any particular range of B.

In addition to the determination of B, the moduli values ($M_0$–$M_5$) may be determined, along with their corresponding signal point constellations, during an adaptive initialization period. A number of factors may govern the selection of the $M_i$ values and the particular signal points assigned to each of the corresponding constellations. For example, the exemplary MMC process described herein requires that $2^B \leq M_0 M_1 \ldots M_5$, which ensures that the integer represented by the B bits can be expressed in terms of the moduli. In addition, the signal points selected for each individual constellation may be limited to a subset of standard values, e.g. $\mu$-law values in the United States and A-law values in Europe. The specific selection of the individual signal points may be governed by any number of cost functions such as transmit power limits, minimum distance between signal points, the probability of occurrence of each signal point, the presence and/or form of digital impairments (e.g., RBS or digital pads), or the peak-to-mean ratio of the transmitted signal. After the modem system determines the values of B, $M_i$, and the signal points associated with each of the $M_i$-point constellations, encoder 200 may begin transmitting information in a normal data mode. It should be noted that each of the above parameters may remain unchanged for the duration of any particular communication session and that one or more of such parameters may be modified in response to, e.g., renegotiation procedures, loss of synchronization, or the like.

With continued reference to FIG. 2, the MMC procedure will be explained in more detail. Encoder 200 receives the B bits to be sent during a data frame of, e.g., six symbols. The MMC procedure allows the B bits to be mapped to six indices, equivalent to B/6 bits per symbol (not necessarily an integer number of bits per symbol). The B bits input to modulus encoder 204 may be processed such that they are represented by an integer R:

$$R = b_0 + b_1 2 + b_2 2^2 + \ldots + b_{B-1} 2^{B-1},$$

where $b_0$ is the first bit in time and $b_{B-1}$ is the last bit in time of the B bits submitted to modulus encoder 204. Each of the $b_i$ values are either zero or one in this expression. It should be appreciated that in practice, R may be suitably expressed in terms of a hexadecimal number for processing by a microprocessor resident at encoder 200.

The number R is further processed such that it is represented in terms of the moduli ($M_0$–$M_5$):

$$R = K_0 + K_1 M_0 + K_2 M_0 M_1 + \ldots + K_5 M_0 M_1 M_2 M_3 M_4$$

The output of modulus encoder 204 are the six index values designated by $K_0$–$K_5$, where $0 \leq K_i < M_i$, and $2^B \leq M_0 M_1 M_2 M_3 M_4 M_5$. Modulus encoder 204 performs the following operations to determine these values:

$R_0 = R;$ $K_0 = R_0 \mod M_0;\ R_1 = (R_0 - K_0)/M_0;$ $K_1 = R_1 \mod M_1;\ R_2 = (R_1 - K_1)/M_1;$ $K_2 = R_2 \mod M_2;\ R_3 = (R_2 - K_2)/M_2;$ $K_3 = R_3 \mod M_3;\ R_4 = (R_3 - K_3)/M_3;$ $K_4 = R_4 \mod M_4;\ R_5 = (R_4 - K_4)/M_4;$ $K_5 = R_5$ The $K_i$ values are used for inputs to the respective signal point maps 208, 210, 212, 214, 216, and 218. A $K_i$ value serves as an index for the selection of a particular codeword from the corresponding $M_i$ map. In the preferred embodiment, the respective outputs from signal point maps 208, 210, 212, 214, 216, and 218 are universal PCM codewords that are related to the $\mu$-law (or A-law) signal point constellations employed by telephone network 130. The specific values assigned to these universal codewords may be found in the proposed V.PCM Standard, published Feb. 4, 1998 by the ITU Telecommunications Standardization Sector. The entire content of this publication is incorporated herein by reference. It should be appreciated that the principles of the present invention may apply in systems that employ direct mapping to $\mu$-law or A-law codeword values, i.e., systems that do not utilize universal codewords. In accordance with one known transmission scheme, these universal PCM codewords (identified by $U_i$ in FIG. 2) are transmitted in a temporal order corresponding to their subscript designations. In other words, the known scheme causes $U_0$, which is represented by the $PCM_0$ octet, to be transmitted first in time and $U_5$, which is represented by the $PCM_5$ octet, to be transmitted last in time.

The universal codewords $U_i$ may be routed to a polarity block 224, which preferably functions to assign a positive or negative sign bit to the universal codewords. The particular sign assigned to the individual universal codewords may be dictated by a spectral shaper 228 that communicates with polarity block 224. Spectral shaper 228 may use redundant sign bits to control the spectral content of the transmit signal in accordance with any number of application-specific parameters, e.g., to facilitate DC suppression.

Polarity block 224 produces a PCM codeword associated with each universal codeword. In the context of this description, $PCM_0$ refers to the first-transmitted symbol or octet in the data frame and $PCM_5$ refers to the last-transmitted symbol or octet in the data frame. Further, $PCM_i$ corresponds to $U_i$ for all values of i. The PCM octets may be input to a multiplexer 232, which is suitably controlled to produce a serial stream of the PCM octets in the designated temporal order.

The PCM octets are transmitted through telephone network 130, converted into analog signals at, e.g., line card 140, and received by user modem 160 (see FIG. 1). User modem 160 may employ suitable analog or digital filtering, conditioning, decoding, and processing techniques to obtain the original data (indicated by $b_0$–$b_{B-1}$ in FIG. 2).

The present invention relates to an alternate technique for performing the modulo operations during the MMC procedure. These modulo operations include a division of numbers, e.g., "$R_1$ modulo $M_1$" calls for the division of $R_1$ by $M_1$. In the preferred embodiment these numbers are integers represented by binary expressions. In practical applications, the efficiency of such binary division processes may be limited by the bit processing capacity of the associated digital signal processors or other functional components. For example, a 16-bit processor may not efficiently perform binary divisions where the dividend exceeds 16 bits; conventional "long-word" binary division may require an undesirable amount of computational power.

In the context of the present invention, the dividend (which is preferably expressed as a binary number) is partitioned into a number of individual binary numbers each having a smaller number of bits. As described in more detail below, these partitioned numbers or "short-words" are then subjected to a division operation in accordance with the present invention to obtain the appropriate binary quotient and remainder. Accordingly, the short-word division methodology may be suitably employed by the MMC process to obtain the values of $K_i$. It should be noted that the techniques of the present invention may be applicable to any MMC process and that the modem system described herein is only one exemplary application for the short-word MMC process.

The short-word division procedure will be described in the context of the following decimal system example. If the quotient and remainder of $$\frac{12345678}{98}$$

are desired, then the large dividend (R=12345678) is first partitioned into a plurality of smaller numbers, e.g., $x_0$=78, $x_1$=56, $x_2$=34, and $x_3$=12. Accordingly, R can now be represented as:

$$R=x_0+x_1(10^2)+x_2(10^4)+x_3(10^6).$$

Next, the short-word divisions are performed as follows:

$$\frac{12}{98} = 0$$

(remainder 12);

$$\frac{1234}{98} = 12$$

(remainder 58);

$$\frac{5856}{98} = 59$$

(remainder 74);

$$\frac{7478}{98} = 76$$

(remainder 30). Note that each successive dividend is formed as the sum of the previous remainder (with shifted digits) and the current $x_i$ number. The respective quotients of these short-word divisions are then recombined by shifting digits to obtain the quotient for the long-word division, i.e., $$\frac{12345678}{98} = 125976$$

(the leading 0 from the first short-word division is disregarded). The remainder of the last short-word division, i.e., 30, is also the remainder of the long-word division.

As shown in the above example, $$\frac{12345678}{98} = 125976$$

with a remainder of 30. If this example were the first step in the exemplary MMC application described herein, then $K_0$ would equal 30 and, for the next MMC step, the quotient 125976 would be divided by $M_1$. This process may be continued until all of the $K_1$ values are suitably obtained. It should be appreciated that the short-word division technique need not be performed for every MMC iteration; the dividends associated with later iterations may not warrant short-word divisions.

The preferred embodiment performs a similar short-word division technique in a binary manner. The present invention contemplates use with practical digital signal processors (DSPs) that have limited processing capabilities. For example, the following example assumes that the particular DSP associated with modulus encoder 204 can efficiently perform division operations with a divisor having up to N bits, where $N \geq \max [\log_2 M_i]$, i=0, 1, . . . L−1. The short word binary division technique preferably partitions the B-bit input into l segments, the first (l−1) segments having b bits and the last (e.g., the most significant) segment having (B−(l−1)b) of the B bits. The last segment may include up to N bits to facilitate efficient division of the initial short word (which may exceed b bits).

When the above conditions for the segment lengths are met, $B \leq (l-1)b+N$ and $l=\mathrm{CEIL}[(B-N)/b]+1$ (for B>N). If $B \leq N$, then the short word technique need not be performed and l=1. As mentioned above, depending on the specific values of B and l the last segment may also contain b bits. With this preferred manner of partitioning, R can be represented as $$R = x_0 + 2^b[x_1 + 2^b[x_2 + \ldots + 2^b[x_{l-2} + 2^b x_{l-1}]]],$$

where $x_0$–$x_{l-2}$ are the partitioned b-bit binary numbers and $x_{l-1}$ has (B−(l−1)b) bits. The short-word division methodology may be applied in the MMC context to obtain the values of $K_i$ that serve as signal point indices in the exemplary modem application described herein.

The following example is presented herein for illustrative purposes only, and those skilled in the art will recognize that the specific values for the various parameters and inputs will vary according to the specific application and the particular data being processed by modulus encoder 204. The parameters for this example are as follows:

R=59,046 (decimal); 1110011010100110 (binary)

B=16;

N=6;

b=4;

l=4;

L=3 (number of moduli utilized by the MMC procedure);

$M_0$=50 (decimal)=110010 (binary);

$M_1$=25 (decimal)=011001 (binary);

$M_2$=51 (decimal)=110011 (binary).

$M_2$, the third modulus, is not needed for calculation purposes in this example. In the modem system described herein, L also represents the number of symbols per data frame and the number of signal point constellations utilized for the particular data transmission session. It should be noted that each of the moduli can be expressed in terms of an N-bit (or less) binary number.

Initially, R is partitioned into the l segments; in this example, each of the segments has b bits. For this example, the partitioning results in the following short words: $x_3$=1110, $x_2$=0110, $x_1$=1010, and $x_0$=0110. It should be noted that the segment containing the most significant bits (e.g., $x_3$) may contain less than b bits or up to N bits depending upon the current MMC parameters and the current binary input. The first MMC operation divides $R_0$ (1110011010100110) by $M_0$ (110010), where $R_0$ initially equals $R_0$. The quotient of this division is utilized as the dividend for the next MMC operation, while the remainder of this division is the MMC output for $K_0$. The preferred short-word division technique is carried out as follows (binary expressions):

$$x_3' = INT\left[\frac{x_3}{M_0}\right] = INT\left[\frac{1110}{110010}\right] = 0000; \quad r_3' = \text{(remainder)} = 1110;$$

$$x_2' = INT\left[\frac{x_2 + r_3' \cdot 2^4}{M_0}\right] = INT\left[\frac{11100110}{110010}\right] = 0100; \quad r_2' = 11110;$$

$$x_1' = INT\left[\frac{x_1 + r_2' \cdot 2^4}{M_0}\right] = INT\left[\frac{111101010}{110010}\right] = 1001; \quad r_1' = 101000;$$

$$x_0' = INT\left[\frac{x_0 + r_1' \cdot 2^4}{M_0}\right] = INT\left[\frac{1010000110}{110010}\right] = 1100; \quad r_0' = 101110.$$

It should be noted that the initial division operation is preferably performed on, e.g., the most significant short word by itself rather than a "combination" of two short words. This technique may be utilized to ensure that the resulting quotient does not exceed a specified bit length, e.g., N bits. If $M_0$ exceeded $x_3$ in the above example, then the first quotient would be zero and the dividend for the next division would be a combination of $x_3$ and $x_2$. If no limitations are imposed on the bit lengths of the resulting quotients and remainders, then the above calculation may instead begin by dividing a combination of $x_3$ and $x_2$ by $M_0$. Those skilled in the art will recognize that the end result is the same regardless of how the initial division operation is performed and that the particular technique may vary depending upon the practical implementation.

In a similar manner as the decimal example, the individual short-word quotients are bit shifted and added to obtain the quotient of $$\frac{R_0}{M_0} = \frac{1110011010100110}{110010},$$

and the overall remainder of this division is the remainder associated with the $x_0'$ calculation. Accordingly, the quotient equals $x_0' + 2^b x_1' 2^{(2b)} x_2' + 2^{(3b)} x_3' = 0000010010011100$, and the remainder equals 101110. It follows that $K_0$=10110 (or 46 in the decimal system) and $R_1$=10010011100 (the dividend for the next MMC operation).

The next MMC operation obtains the values for $K_1$ and $K_2$ by dividing $R_1$ (10010011100) by $M_1$ (11001) in the same manner as described above. For this iteration, $R_1$ is partitioned into the short word segments. Thus, the partitioning of $R_1$ results in the following short words: $x_2'$=0100, $x_1'$=1001, and $x_0'$=1100. The number of short words is reduced because $x_3'$=0 in the previous MMC operation. This subsequent MMC operation is performed as follows (binary expressions used):

$$x_2'' = INT\left[\frac{x_2'}{M_i}\right] = INT\left[\frac{0100}{11001}\right] = 0000; \qquad r_2'' = 0100;$$

$$x_1'' = INT\left[\frac{x_1' + r_2'' \cdot 2^4}{M_i}\right] = INT\left[\frac{01001001}{11001}\right] = 0010; \quad r_1'' = 10111;$$

$$x_0'' = INT\left[\frac{x_0' + r_1'' \cdot 2^4}{M_i}\right] = INT\left[\frac{101111100}{11001}\right] = 1111; \quad r_0'' = 0101.$$

Again, the short-word quotients are bit shifted and added to obtain the quotient of $$\frac{R_1}{M_1} = \frac{10010011100}{11001},$$

and the overall remainder of this division is the remainder associated with the $x_0''$ calculation. Accordingly, the quotient equals 000000101111, and the remainder equals 0101. It follows that $K_1$=0101 (5 in the decimal system) and $R_2$=101111 (47 in the decimal system). For this example where L=3, $R_2$ is also equal to $K_2$. Accordingly, the outputs for this particular MMC procedure are: $K_0$=46, $K_1$=5, and $K_2$=47. As described generally above, the MMC outputs can be used to express R in terms of the moduli:

$$R = K_0 + K_1 M_0 + K_2 M_0 M_1 = 46 + 5(50) + 47(50)(25) = 59,046.$$

Figure 3:
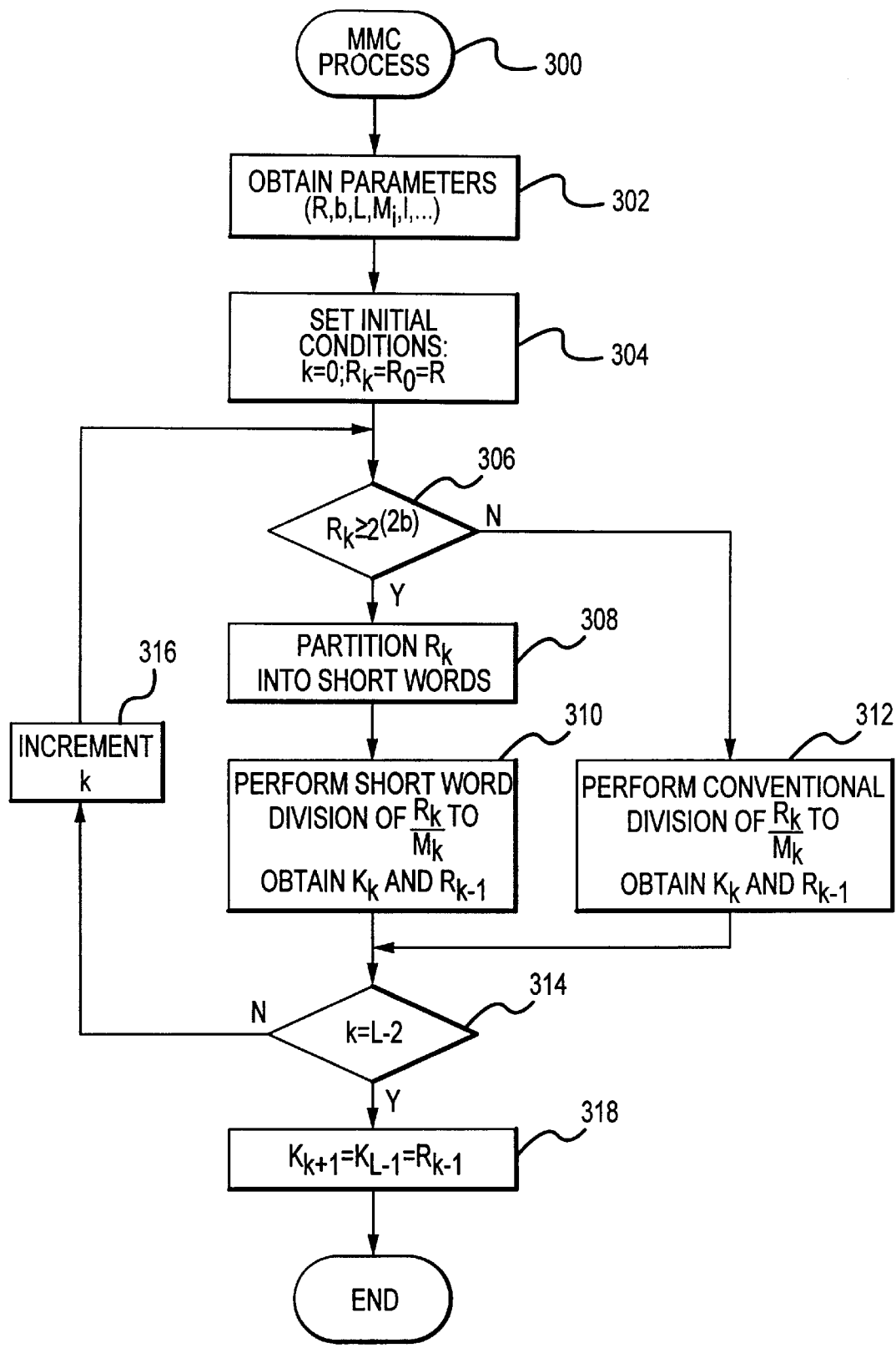
FIG. 3 is a flow diagram of an exemplary multiple modulus conversion process that may be performed by the encoder shown in FIG. 2.

Referring now to FIG. 3, the short-word division techniques described above may be employed in a generalized MMC process 300. In the exemplary modem system described herein, process 300 (or a portion thereof) may be performed for each set of bits input into modulus encoder 204 (see FIG. 2) to suitably obtain the constellation index values $K_0$–$K_5$. Process 300 may begin with a task 302, which obtains the MMC operating parameters such as B (the number of MMC bits per frame), b (the bit length for either all of the short words or all but the most significant of the short words), l (the number of segments to be utilized in the partitioning of the B bits), L (the number of moduli), and the values of $M_i$. These and other parameters may be determined during an initialization routine or during any suitable routine conducted prior to process 300. For a given application, the number of moduli may be predetermined, e.g., L=6 for the exemplary modem system described herein. In addition, B may be determined according to a current data rate and the number of redundant bits per flame. In practice, b may be limited to six or eight bits such that the short-word binary division operations can be efficiently carried out by a 16-bit processor. It should be appreciated that task 302 need not be repeated after the parameters are initially established.

The specific value of b may be adaptively determined in response to the given $M_i$ values such that the partitioned short words do not exceed a manageable number of bits. For example, if the $x_i$ values are limited to 16 bits, then b may be selected such that the following relationship is satisfied: $1 \leq b \leq P - \max[\log_2 M_i$, for all i=0 to L–1], where P is the arithmetic word length (e.g., P=16) of the particular DSP employed by the system. In the context of the present invention, P may be considered to be the maximum bit length for a dividend processed by the DSP, while N may be considered to be the maximum bit length for a divisor processed by the DSP. In many practical DSPs, P is equal to 16 and N is equal to 8. This practical limitation often makes long-word binary division difficult to perform in an efficient manner.

In accordance with the above relationships, the value of b can be determined according to the maximum moduli size. Generally, smaller values of b are desirable to minimize the likelihood of overflow with respect to the $x_i$ values. In addition, although the number of short-word division iterations may increase as b decreases, the division and modulo operations can be implemented as successive subtractions or with a simple look-up table. As described above, l preferably satisfies the following relationship: l=CEIL [(B–N)/b]+1.

A task 304 may be performed to initialize a number of variables or parameters associated with MMC process 300. For example, task 304 may suitably initialize a counter variable, e.g., k=0, and initialize a number of variables $K_i$ such that $K_i$=0 for all values of i. Task 304 may also initialize a parameter l' such that l'=l. Following the initialization of these variables, a task 305 may be performed to get the current MMC bits, e.g., to set $R_0$=R. As described above, R is defined as the current B-bit number input into modulus encoder 204. Next, a task 306 is preferably performed to suitably partition the binary number $R_0$ into a number of short words (e.g., $x_0$, $x_1$, . . . , $x_{l-1}$). Task 306 may be accomplished by directing the B bits that define $R_0$ into a number of suitable memory or register locations by performing, e.g., a suitable bit masking routine. Alternatively, task 306 may simply access specific memory locations associated with $R_0$. As described in more detail below, the short-word division technique may be conducted such that each successive $R_k$ is predefined in terms of the appropriate $x_i$ values. As mentioned above in connection with the sample calculations, a number of leading zeros may be added to "fill" the most significant bits associated with $x_{l-1}$. Following task 306, there are l short word segments identified by the $x_i$ variables.

Task 306 preferably leads to a task 308, during which a short-word division technique is performed upon the input number R to obtain the MMC outputs. A general process for performing the short-word division is described in more detail below. It should be appreciated that MMC process 300 need not always perform task 308 and that process 300 may employ conventional division operations in lieu of the short word divisions. For example, if the binary expression of the current dividend, i.e., $R_k$, is sufficiently short and manageable by modulus encoder 204, then it may be more computationally efficient to perform conventional divisions.

Following task 308, the values of $K_0$, $K_1$, . . . , $K_{L-1}$ have been obtained by the short word division procedure (described below). Accordingly, a task 310 may be performed to suitably provide these MMC outputs to, e.g., signal point maps 208, 210, 212, 214, 216, and 218 (see FIG. 2). Following task 310, MMC process 300 ends for the current input of B bits. Of course, process 300 may repeat in a continuous manner to facilitate encoding of a digital data stream.

Figure 4:
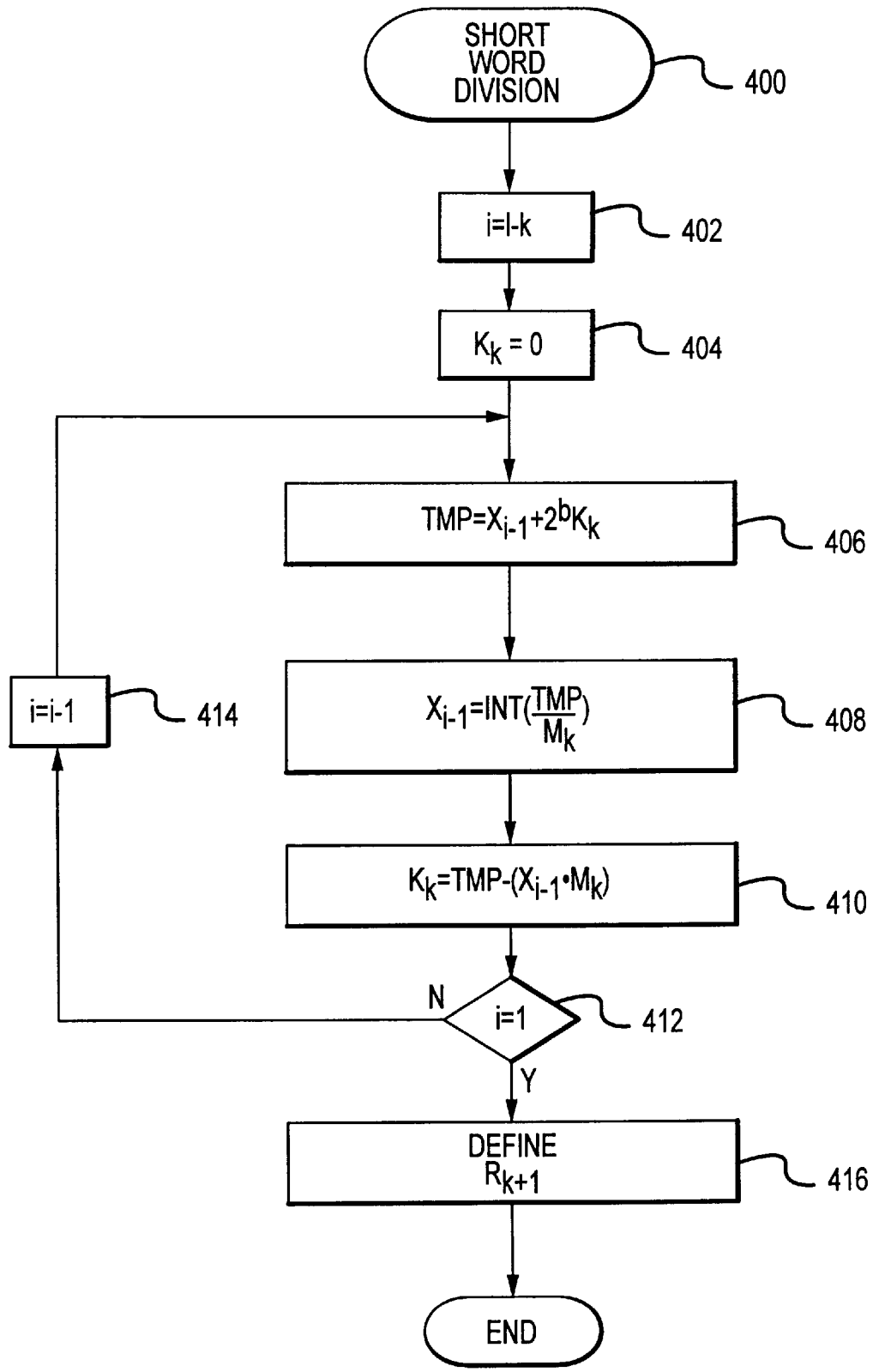
FIG. 4 is a flow diagram of an exemplary short-word division process that may be performed by the encoder shown in FIG. 2.

With reference to FIG. 4, an exemplary short-word division process 400 is illustrated as a pseudo-code flow diagram. Process 400, or a suitable equivalent, may be performed during task 308 described above in connection with MMC process 300 (see FIG. 3). Process 400 and process 300 may be suitably incorporated into a single routine or realized by any number of alternate equivalent implementations.

Process 400 may begin by setting a suitable flag to an appropriate value, e.g., one (task 401). As described in more detail below, this flag may be utilized for purposes of adjusting the current number of segments to be processed during process 400. Next, a task 402 is preferably performed to initialize an index variable i such that i=l'–1, where l' indicates a current segment count associated with process 400. The variable l' is preferably employed to ensure that process 400 does not perform unnecessary computations where the most significant short word in a current dividend is equal to zero. The function of l' will be further clarified in the following description of process 400. As described in connection with MMC process 300, the initial value of l' is equal to 1 (the number of segments contained in $R_0$). Accordingly, in the preferred embodiment, the first division operation in the MMC procedure is performed with k=0 and i=l−1.

Task 402 may lead to a task 404, which assigns a binary number to a temporary variable TMP, such that TMP=$x_i$+$K_k \times 2^b$. In the exemplary embodiment described herein, TMP may be thought of as a combination of two short binary words: $x_i$ and $K_k$, where $K_k$ is bit-shifted by b bits. In the first iteration, i.e., where $K_0$=0, TMP is simply equal to $x_i$. The actual division operation is preferably performed in a task 406. Task 406 updates the variable $x_i$ such that $$\left[\frac{TMP}{M_k}\right].$$

Task 406 obtains the quotient of $$\frac{TMP}{M_k},$$

while a task 408 obtains the remainder or residual of $$\frac{TMP}{M_k}.$$

In the preferred embodiment, task 408 updates the variable $K_k$ such that $K_k$=TMP−($x_i M_k$). In general, the quotient obtained in task 406 is utilized in the division associated with the next modulus, while the remainder obtained in task 408 is utilized in the next iteration of the division associated with the present modulus.

After task 408 is complete, process 400 may lead to a query task 410, which tests whether the flag is equal to the value set forth in task 401. It should be appreciated that any suitable procedure or mechanism may be employed to realize the functionality of this flag. In this exemplary embodiment, if query task 410 determines that the flag equals one, then a query task 412 is preferably performed to determine whether the current $x_i$ word equals zero. If the current $x_i$ word is zero, then a task 414 may be performed to suitably decrement the current value of l' by one. Query task 410, query task 412, and task 414 are preferably performed to ensure that process 400 does not unnecessarily process the most significant short word in the next division iteration if that short word is equal to zero.

If query task 412 determines that the current $x_i$ word does not equal zero, then a task 415 may be performed to set the flag to zero. A query task 416 is performed following either task 414 or task 415. In addition, query task 416 is preferably performed if query if query task 410 determines that the flag does not equal 1, i.e., if query task 410 determines that the flag is equal to zero. The use of the flag, or other suitable mechanism, ensures that process 400 does not perform unnecessary operations when one or more of the most significant short words are equal to zero. Thus, the segment length continues to be decremented (task 414) until a nonzero short word is encountered (query task 412). If the most significant short word is nonzero, then the flag is set to zero such that the segment length adjusting procedure is bypassed from that point on.

Query task 416 tests whether i=0. If query task 416 determines that i≠0, then a task 418 decrements the current value of i by one. After task 418, process 400 is preferably reentered at task 404 to perform the next short-word division operation associated with the current modulus $M_k$. Due to the decrementing of i, the next iteration of task 404 shifts the remainder from the previous division (i.e., the current value of $K_k$) by b bits and adds the next b-bit short word to obtain the new value of TMP. Query task 416 ensures that this short-word division technique is repeated until the last b-bit short word, i.e., $x_0$, is included in the current value of TMP. Accordingly, if query task 416 determines that i=0, then a query task 420 may be performed.

Query task 420 suitably determines whether k=L−2. It should be noted that query task 420 may test for any suitable condition for purposes of determining whether process 400 is near completion. If query task 420 determines that k≠L−2, then process 400 leads to a task 422, which increments the current value of k by one. In other words, if the current value of k does not equal L−2, then the MMC procedure has not been completed. Following task 422, process 400 is preferably reentered at task 401 to perform the division operations with the next modulus as a divisor.

If query task 420 determines that k=L−2, then the last division iteration has been completed and a task 424 may be performed. Task 424 defines $K_{L-1}$ in terms of the current state of the $x_i$ values. In other words, the quotients obtained during the previous short word division operation are utilized to define the last "remainder" as follows:

$$K_{L-1}=x_0+2^b x_1+2^{2b}x_2+\ldots+2^{(l-1)b}x_{(l-1)}.$$

This expression may contain as many terms as applicable for the given MMC parameters. As described briefly above, a practical implementation of process 400 may simply store the current values of $x_i$ as it progresses; task 426 need not actually be performed and is described herein for purposes of explanation and clarity.

Following task 426, process 400 ends. As described above, task 310 of MMC process 300 may follow task 426 (see FIG. 3). Thus, in the context of the exemplary modem system described herein, MMC process 300 and short-word division process 400 may cooperate to produce $K_0$–$K_5$.

Those skilled in the art will appreciate that any number of alternative and equivalent processes may be implemented to carry out MMC process 300 and/or short-word division process 400. In addition, processes 300 and 400 may include additional tasks or may be incorporated into a more complex processing scheme having additional functionalities.

In summary, the present invention provides improved techniques for use in a modem system that employs a multiple modulus conversion (MMC) procedure. The present invention provides an efficient MMC procedure that is suitable for inputs represented by a relatively high number of bits. The preferred MMC procedure operates in a systematic manner that enables the processing of a large number of input bits by practical digital processors that have a limited bit processing capacity.

The present invention has been described above with reference to a preferred exemplary embodiments. However, those skilled in the art will recognize that changes and modifications may be made to these preferred embodiments without departing from the scope of the present invention. For example, the processes described herein may be equivalently performed with additional or alternative steps, and the conditional tests set forth in these processes may vary from application to application. In addition, the particular variable names used herein to identify the various operands and processing quantities are not intended to limit the scope of the invention in any way. Such changes and modifications are intended to be included within the scope of the present invention, as expressed in the following claims.

What is claimed is:

1. A multiple modulus conversion (MMC) method for obtaining a plurality of index values associated with a plurality of moduli, said plurality of index values and said plurality of moduli being capable of representing a binary input, said MMC method comprising the steps of:

obtaining a binary input having a number of bits;

representing said binary input as a plurality of short words;

performing a short-word division operation to divide at least one of said short words with a modulus value; and determining an index value associated with said modulus value, said index value being responsive to said short-word division operation.

2. An MMC method according to claim 1, wherein: said representing step represents said binary input as l short words, each having at least b bits;

said short words are identified by $x_0$–$x_{l-1}$ in accordance with the following expression: $R_0=x_0+2^b[x_1+2^b[x_2+ \ldots +2^b[x_{l-2}+2^b x_{l-1}]]]$, where $R_0$ is said binary input; and said performing step comprises the steps of:

defining a first temporary dividend (TMP1) such that $TMP1=x_{l-2}+2^b x_{l-1}$;

determining a quotient and a remainder (REM1) of $$\frac{TMP1}{M_0},$$

where $M_0$ is one of said moduli;

defining a second temporary dividend (TMP2) such that $TMP2=x_{l-3}+2^b$ (REM1); and determining a quotient and a remainder of $$\frac{TMP2}{M_0}.$$

3. An MMC method according to claim 1, wherein:

said representing step represents said binary input as l short words, each having at least b bits;

said short words are identified by $x_0$–$x_{l-1}$ in accordance with the following expression: $R_0=x_0+2^b[X_1+2^b[x_2+ \ldots +2^b[x_{l-2}+2^b x_{l-1}]]]$, where $R_0$ is said binary input; and said performing step comprises the steps of:

defining a first temporary dividend (TMP1) such that $TMP1=x_{l-1}$;

determining a quotient and a remainder (REM 1) of $$\frac{TMP1}{M_0},$$

where $M_0$ is one of said moduli;

defining a second temporary dividend (TMP2) such that $TMP2=x_{l-2}+2^b$(REM1); and determining a quotient and a remainder of $$\frac{TMP2}{M_0}.$$

4. An MMC method according to claim 1, wherein each of said short words includes b bits and said representing step represents said binary input as l short words.

5. An MMC method according to claim 1, further comprising the step of adaptively determining the value of b in response to the values of said moduli.

6. An MMC method according to claim 5, wherein b is adaptively determined in response to the largest one of said moduli.

7. An MMC method according to claim 5, wherein:

said method is performed by a processor capable of performing N-bit division operations and P-bit arithmetic operations;

b is adaptively determined in accordance with the following relationship: $1 \leq b \leq P-\max[\log_2 M_i], \forall i$;

$N \geq \max[\log_2 M_i], \forall i$; and $M_i$ represents the values of said moduli.

8. A modulus encoder comprising:

first means for obtaining a number of moduli;

second means for obtaining a binary input having a plurality of bits; and processing means configured to:

represent said binary input as a plurality of short words; and perform a short-word division procedure in connection with said short words to thereby determine a plurality of index values associated with said moduli, where said plurality of index values and said plurality of moduli are capable of representing said binary input.

9. A modulus encoder according to claim 8, wherein:

said processing means is configured to represent said binary input as l short words, each having at least b bits;

said short words are identified by $x_0$–$x_{l-1}$ in accordance with the following expression: $R_0=x_0+2^b[x_1+2^b[x_2+ \ldots +2^b[x_{l-2}+2^b x_{l-1}]]]$, where $R_0$ is said binary input; and during said short-word division procedure, said processing means is configured to:

define a first temporary dividend (TMP1) such that $TMP1=x_{l-2}+2^b x_{l-1}$;

determine a quotient and a remainder (REM1) of $$\frac{TMP1}{M_0},$$

where $M_0$ is one of said moduli;

define a second temporary dividend (TMP2) such that $TMP2=x_{l-3}+2^b$(REM1); and determine a quotient and a remainder of $$\frac{TMP2}{M_0}.$$

10. A modulus encoder according to claim 8, wherein:

said processing means is configured to represent said binary input as l short words, each having at least b bits;

said short words are identified by $x_0$–$x_{l-1}$ in accordance with the following expression: $R_0=x_0+2^b[x_1+2^b[x_2+ \ldots +2^b[x_{l-2}+2^b x_{l-1}]]]$, where $R_0$ is said binary input; and during said short-word division procedure, said processing means is configured to:

define a first temporary dividend (TMP1) such that $TMP1 = x_{l-1}$;

determine a quotient and a remainder (REM1) of $$\frac{TMP1}{M_0},$$

where $M_0$ is one of said moduli;

define a second temporary dividend (TMP2) such that $TMP2 = x_{i-2} + 2^b(REM1)$; and determine a quotient and a remainder of $$\frac{TMP2}{M_0}.$$

11. A modulus encoder according to claim 8, wherein said processing means is configured to represent said binary input as l short words, each of said short words having b bits.

12. A modulus encoder according to claim 8, further comprising means for adaptively determining the value of b in response to the values of said moduli.

13. A modulus encoder according to claim 12, wherein said means for adaptively determining is configured to determine the value of b in response to the largest one of said moduli.

14. A modulus encoder according to claim 12, wherein:

said processing means is capable of performing division operations with a divisor having a maximum length of N bits and with a dividend having a maximum length of P bits;

said means for adaptively determining is configured to determine the value of b in accordance with the following relationship: $1 \leq b \leq P - \max[\log_2 M_i]$, $\forall i$; $N \geq \max[\log_2 M_i]$, $\forall i$; and $M_i$ represents said number of moduli.

15. A modulus encoder according to claim 14, wherein said processing means is configured such that N=8 and P=16.

16. A short-word division method for use in a multiple modulus conversion (MMC) procedure, said MMC procedure obtaining a plurality of index values $K_0$–$K_{L-1}$ associated with a respective plurality of moduli $M_0$–$M_{L-1}$ said short-word division method comprising the steps of:

initializing a variable k such that k=0;

representing a binary expression ($R_k$) as a number of short words, each of said short words having at least b bits;

performing a short word division operation to determine a quotient ($R_{k=1}$) and a remainder $$\frac{R_k}{M_k};$$

and repeating said representing and performing steps for incremental values of k to thereby obtain said plurality of index values $K_0$–$K_{L-1}$.

17. A method according to claim 16, wherein:

said repeating step is successively performed for values of k up to k=L–2; and when k=L–2, $K_{k+1} = K_{L-1} = R_{k+1}$.

18. A method according to claim 16, wherein said representing step represents a binary input ($R_0$) as l short words identified by $x_0$–$x_{l-1}$, where said binary input is represented by the following expression: $R_0 = x_0 + 2^b[x_1 + 2^b[x_2 + \ldots + 2^b[x_{l-2} + 2^b x_{l-1}]]]$.

19. A method according to claim 16, wherein said representing step represents $R_k$ as a number of 8-bit short words.

* * * * *